US012742036B2

(12) United States Patent
Lee et al.

(10) Patent No.: US 12,742,036 B2
(45) Date of Patent: Sep. 22, 2026

(54) HYDROPHILIC ACRYLIC-MODIFIED POLYURETHANE AND METHOD FOR PREPARING SAME, AND WATER-BASED PAINT COMPOSITION PREPARED THEREFROM AND MANUFACTURING METHOD THEREOF

(71) Applicant: SAMYANG CORPORATION, Seoul (KR)

(72) Inventors: Jae Hoon Lee, Daejeon (KR); Seong Ye Seo, Daejeon (KR); Hoon Ryu, Daejeon (KR); Jun Seop Im, Hwaseong-si (KR)

(73) Assignee: SAMYANG CORPORATION, Seoul (KR)

( * ) Notice: Subject to any disclaimer, the term of this patent is extended or adjusted under 35 U.S.C. 154(b) by 605 days.

(21) Appl. No.: 18/010,894

(22) PCT Filed: Jun. 16, 2021

(86) PCT No.: PCT/KR2021/007548
§ 371 (c)(1),
(2) Date: Dec. 16, 2022

(87) PCT Pub. No.: WO2021/256853
PCT Pub. Date: Dec. 23, 2021

(65) Prior Publication Data

US 2023/0235112 A1 Jul. 27, 2023

(30) Foreign Application Priority Data

Jun. 17, 2020 (KR) ........................ 10-2020-0073533

(51) Int. Cl.

| | |
|---|---|
| ***C08G 18/48*** | (2006.01) |
| ***C08F 222/10*** | (2006.01) |
| ***C08G 18/32*** | (2006.01) |
| ***C08G 18/62*** | (2006.01) |
| ***C08G 18/75*** | (2006.01) |
| ***C08G 18/76*** | (2006.01) |
| ***C09D 7/20*** | (2018.01) |
| ***C09D 7/61*** | (2018.01) |
| ***C09D 175/16*** | (2006.01) |

(52) U.S. Cl.
CPC .... *C08G 18/4833* (2013.01); *C08F 222/1065* (2020.02); *C08G 18/3218* (2013.01); *C08G 18/4883* (2013.01); *C08G 18/6229* (2013.01); *C08G 18/755* (2013.01); *C08G 18/7671* (2013.01); *C09D 7/20* (2018.01); *C09D 7/61* (2018.01); *C09D 175/16* (2013.01); *C08G 2150/00* (2013.01)

(58) Field of Classification Search
CPC .............. C08G 18/284; C08G 18/3218; C08G 18/4833; C08G 18/4883; C08L 75/14; C08L 75/16; C08F 222/1065; C08F 22/1065; C09D 175/14; C09D 175/16
See application file for complete search history.

(56) References Cited

U.S. PATENT DOCUMENTS

| | | | |
|---|---|---|---|
| 6,608,167 | B1 | 8/2003 | Hayes et al. |
| 2015/0005408 | A1 | 1/2015 | Lindekens et al. |

FOREIGN PATENT DOCUMENTS

| | | | | | |
|---|---|---|---|---|---|
| JP | 2019-99608 | A | | 6/2019 | |
| KR | 10-2006-0094134 | A | | 8/2006 | |
| KR | 10-0649432 | B1 | | 11/2006 | |
| KR | 20170136069 | A | * | 12/2017 | ............... C09D 5/03 |
| KR | 10-1912193 | B1 | | 10/2018 | |
| KR | 10-2019-0120998 | A | | 10/2019 | |

OTHER PUBLICATIONS

Partial machine translation of KR-20170136069-A (Year: 2017).*
International Search Report (PCT/ISA/210) issued in PCT/KR2021/007548, dated Sep. 28, 2021.
Owji et al., "Synthesis, Characterization, and 3D Printing of an Isosorbide-Based, Light-Curable, Degradable Polymer for Potential Application in Maxillofacial Reconstruction," ACS Biomaterials Science & Engineering, vol. 6, No. 5, Oct. 2, 2019, pp. 2578-2587.
Extended European Search Report for European Application No. 21826187.3, dated May 29, 2024.
English translation of KR-10-2019-0120998-A published on Oct. 25, 2019.

* cited by examiner

*Primary Examiner* — Kregg T Brooks
(74) *Attorney, Agent, or Firm* — Birch, Stewart, Kolasch & Birch, LLP

(57) ABSTRACT

The present invention relates to a hydrophilic acrylic-modified polyurethane and a method for preparing same, and a water-based paint composition using same and a manufacturing method thereof and, more specifically, to a hydrophilic acrylic-modified polyurethane and a method for preparing same, and a water-based paint composition using same and a manufacturing method thereof, the hydrophilic acrylic-modified polyurethane comprising: a polymerization unit derived from an anhydrosugar alcohol-alkylene oxide adduct; a polymerization unit derived from polyisocyanate; and a polymerization unit derived from hydroxyalkyl (meth) acrylate, and capable of providing a water-based paint composition in which eco-friendliness, adhesiveness (adhesion), crack resistance and water resistance are all improved.

11 Claims, No Drawings

HYDROPHILIC ACRYLIC-MODIFIED POLYURETHANE AND METHOD FOR PREPARING SAME, AND WATER-BASED PAINT COMPOSITION PREPARED THEREFROM AND MANUFACTURING METHOD THEREOF

TECHNICAL FIELD

The present invention relates to a hydrophilic acryl-modified polyurethane and a method for preparing the same, and a waterborne coating composition prepared therefrom and a method for preparing the same, and more specifically, the present invention relates to a hydrophilic acryl-modified polyurethane which comprises polymerized units derived from anhydrosugar alcohol-alkylene oxide adduct, polymerized units derived from polyisocyanate and polymerized units derived from hydroxyalkyl (meth)acrylate, and can provide a waterborne coating composition with improvement in all of eco-friendliness, adhesiveness (adhesion), crack resistance and water resistance, and a method for preparing the same, and a waterborne coating composition prepared therefrom and a method for preparing the same.

BACKGROUND ART

Polyols and isocyanates, which are essential components for polyurethane, are usually prepared from petroleum-based raw materials. However, in the field of polyurethane, due to various reasons such as accelerated depletion of petroleum resources, demand to reduce greenhouse gas emissions according to climate change, rise of raw material prices, and increasing need for recyclable raw materials, a method for partially or completely replacing polyols and isocyanates prepared from petroleum-based raw materials with environmentally friendly components has been requested.

Polyols can be produced from recyclable biomass such as natural vegetable oils, cellulose, lignin, etc., and biopolyols derived from natural vegetable oils are already being produced on a commercial scale. The properties of biopolyol produced become different according to the type of biomass used for the production. In general, castor oil, palm oil, etc. are used for the production of soft and hard polyurethanes and synthetic polyols, and soybean oil is used for the production of polyols for soft polyurethane. However, the currently produced biomass-based biopolyol has a disadvantage in that it has a high viscosity.

Natural vegetable oil-based isocyanates are essentially aliphatic compounds, which have a disadvantage in that they are less reactive than aromatic diisocyanates which are based on petroleum. Therefore, research on preparing diisocyanate using biomass has not been conducted much.

Hydrogenated sugar (also referred to as "sugar alcohol") means a compound obtained by adding hydrogen to the reductive end group in sugar, and generally has a chemical formula of $HOCH_2(CHOH)_nCH_2OH$ wherein n is an integer of 2 to 5. According to the number of carbon atoms, hydrogenated sugar is classified into tetritol, pentitol, hexitol and heptitol (4, 5, 6 and 7 carbon atoms, respectively). Among them, hexitol having 6 carbon atoms includes sorbitol, mannitol, iditol, galactitol, etc. and in particular, sorbitol and mannitol are very useful materials.

Anhydrosugar alcohol has a diol form with two hydroxyl groups in the molecule, and can be produced by using hexitol derived from starch (for example, Korean Patent No. 10-1079518 and Korean Laid-open Patent Publication No. 10-2012-0066904). Because anhydrosugar alcohol is an environmentally friendly material derived from recyclable natural resources, it has received much interest for a long time and researches on its production continue to proceed. Among such anhydrosugar alcohols, isosorbide produced from sorbitol has the widest industrial applicability at present.

Anhydrosugar alcohol can be used in various fields including treatment of heart and blood vessel diseases, patch adhesive, medicaments such as mouthwash, etc., solvents for compositions in the cosmetics industry, emulsifiers in the food industry, etc. In addition, it can increase the glass transition temperature of polymer materials like polyester, PET, polycarbonate, polyurethane, epoxy resin, etc., and improve the strength of such materials. Furthermore, because anhydrosugar alcohol is an environmentally friendly material derived from natural resources, it is very useful in the plastics industry such as bioplastics and the like. It is also known that anhydrosugar alcohol can be used as an adhesive, environmentally friendly plasticizer, biodegradable polymer, and environmentally friendly solvent for water-soluble lacquer.

As such, anhydrosugar alcohol is receiving much interest because of its wide applicability, and the level of practical industrial application thereof is increasing.

Problems to be Solved

The purpose of the present invention is to provide a hydrophilic acryl-modified polyurethane and a method for preparing the same wherein eco-friendliness is improved by utilizing derivative of anhydrosugar alcohol, and a waterborne coating composition prepared therefrom and a method for preparing the same wherein all of adhesiveness (adhesion), crack resistance and water resistance as well as eco-friendliness are improved by using the polyurethane.

Technical Means

In order to achieve the above-stated purpose, the present invention provides a hydrophilic acryl-modified polyurethane comprising: polymerized units derived from anhydrosugar alcohol-alkylene oxide adduct; polymerized units derived from polyisocyanate; and polymerized units derived from hydroxyalkyl (meth)acrylate.

In other aspect, the present invention provides a method for preparing a hydrophilic acryl-modified polyurethane, comprising the steps of: (1) reacting anhydrosugar alcohol-alkylene oxide adduct and polyisocyanate to prepare intermediate having terminal isocyanate group; and (2) reacting the intermediate obtained in said step (1) and hydroxyalkyl (meth)acrylate.

In another aspect, the present invention provides a waterborne coating composition comprising: a polymer prepared by polymerization reaction of the hydrophilic acryl-modified polyurethane and hydrophilic acryl monomer; and water.

In another aspect, the present invention provides a method for preparing a waterborne coating composition, comprising a step of conducting polymerization reaction of the hydrophilic acryl-modified polyurethane and hydrophilic acryl monomer, in the presence of water as solvent and polymerization initiator.

Effect of the Invention

The hydrophilic acryl-modified polyurethane according to the present invention has excellent eco-friendliness, and the waterborne coating composition prepared by utilizing the same is free of organic solvent and so is environmentally friendly, and at the same time, adhesiveness (adhesion), crack resistance and water resistance thereof are all improved and so it exhibits excellent coating performance.

CONCRETE MODE FOR CARRYING OUT THE INVENTION

The present invention is explained in more detail below.

[Hydrophilic Acryl-Modified Polyurethane]

The hydrophilic acryl-modified polyurethane of the present invention comprises polymerized units derived from anhydrosugar alcohol-alkylene oxide adduct; polymerized units derived from polyisocyanate; and polymerized units derived from hydroxyalkyl (meth)acrylate.

The anhydrosugar alcohol-alkylene oxide adduct (also referred to as "anhydrosugar alcohol-alkylene glycol") is an adduct obtained by reacting hydroxyl group(s) at both ends or one end (preferably both ends) of anhydrosugar alcohol with alkylene oxide, and it means a compound in a form wherein hydrogen(s) of hydroxyl group(s) at both ends or one end (preferably both ends) of anhydrosugar alcohol is (are) substituted with hydroxyalkyl group(s) which is a ring-opened form of alkylene oxide.

In an embodiment, the alkylene oxide may be a linear alkylene oxide having 2 to 8 carbons or a branched alkylene oxide having 3 to 8 carbons, and more concretely, it may be selected from ethylene oxide, propylene oxide or a combination thereof.

The anhydrosugar alcohol can be prepared by dehydration reaction of hydrogenated sugar derived from natural product. Hydrogenated sugar (also referred to as "sugar alcohol") means a compound obtained by adding hydrogen to the reductive end group in sugar, and generally has a chemical formula of $HOCH_2(CHOH)_nCH_2OH$ wherein n is an integer of 2 to 5. According to the number of carbon atoms, hydrogenated sugar is classified into tetritol, pentitol, hexitol and heptitol (4, 5, 6 and 7 carbon atoms, respectively). Among them, hexitol having 6 carbon atoms includes sorbitol, mannitol, iditol, galactitol, etc. and in particular, sorbitol and mannitol are very useful materials.

The anhydrosugar alcohol may be monoanhydrosugar alcohol, dianhydrosugar alcohol or a mixture thereof, and although it is not especially limited, dianhydrosugar alcohol can be used.

Monoanhydrosugar alcohol is an anhydrosugar alcohol formed by removing one molecule of water from inside of the hydrogenated sugar, and it has a tetraol form with four hydroxyl groups in the molecule. In the present invention, the kind of the monoanhydrosugar alcohol is not especially limited, and it may be preferably monoanhydrohexitol, and more concretely 1,4-anhydrohexitol, 3,6-anhydrohexitol, 2,5-anhydrohexitol, 1,5-anhydrohexitol, 2,6-anhydrohexitol or a mixture of two or more of the foregoing.

Dianhydrosugar alcohol is an anhydrosugar alcohol formed by removing two molecules of water from inside of the hydrogenated sugar, and it has a diol form with two hydroxyl groups in the molecule, and can be produced by using hexitol derived from starch. Because dianhydrosugar alcohol is an environmentally friendly material derived from recyclable natural resources, it has received much interest for a long time and researches on its production continue to proceed. Among such dianhydrosugar alcohols, isosorbide produced from sorbitol has the widest industrial applicability at present.

In the present invention, the kind of the dianhydrosugar alcohol is not especially limited, and it may be preferably dianhydrohexitol, and more concretely 1,4:3,6-dianhydrohexitol. 1,4:3,6-dianhydrohexitol may be isosorbide, isomannide, isoidide or a mixture of two or more of the foregoing.

In an embodiment, the anhydrosugar alcohol-alkylene oxide adduct may be a compound represented by the following formula 1, or a mixture of two or more of such compounds.

[Formula 1]

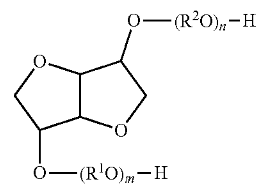

In the above formula 1, each of $R^1$ and $R^2$ independently represents a linear alkylene group having 2 to 8 carbons or a branched alkylene group having 3 to 8 carbons, each of m and n independently represents an integer of 0 to 15, and m+n represents an integer of 1 to 30.

More preferably, in the above formula 1, each of $R^1$ and $R^2$ independently represents ethylene group, propylene group or isopropylene group, and preferably $R^1$ and $R^2$ are the same, and each of m and n independently represents an integer of 0 to 14, provided that m+n is an integer of 1 or more, 2 or more, or 3 or more, and an integer of 25 or less, 20 or less, 15 or less, or 12 or less, and for example, it represents an integer of 1 to 25, preferably an integer of 2 to 20, and more preferably an integer of 3 to 15.

In an embodiment, the anhydrosugar alcohol-alkylene oxide adduct may be anhydrosugar alcohol-propylene oxide adduct represented by the following formula 1-1, anhydrosugar alcohol-ethylene oxide adduct represented by the following formula 1-2, or a mixture thereof.

[Formula 1-1]

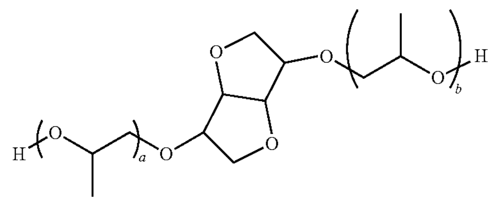

In the above formula 1-1, each of a and b independently represents an integer of 0 to 15, and a+b represents an integer of 1 to 30.

More preferably, in the above formula 1-1, each of a and b independently represents an integer of 0 to 14, provided that a+b is an integer of 1 or more, 2 or more, or 3 or more, and an integer of 25 or less, 20 or less, 15 or less, or 12 or less, and for example, it represents an integer of 1 to 25, preferably an integer of 2 to 20, and more preferably an integer of 3 to 15.

[Formula 1-2]

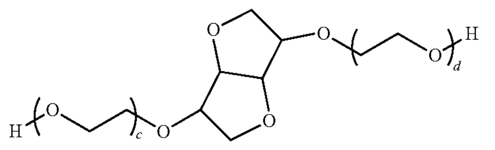

In the above formula 1-2, each of c and d independently represents an integer of 0 to 15, and c+d represents an integer of 1 to 30.

More preferably, in the above formula 1-2, each of c and d independently represents an integer of 0 to 14, provided that c+d is an integer of 1 or more, 2 or more, or 3 or more, and an integer of 25 or less, 20 or less, 15 or less, or 12 or less, and for example, it represents an integer of 1 to 25, preferably an integer of 2 to 20, and more preferably an integer of 3 to 15.

In an embodiment, the anhydrosugar alcohol-alkylene oxide adduct may be that prepared by a preparation method comprising the steps of: (1) treating anhydrosugar alcohol with acid component; and (2) conducting addition reaction of the acid-treated anhydrosugar alcohol obtained in said step (1) and alkylene oxide.

More concretely, the anhydrosugar alcohol-alkylene oxide adduct may be that prepared by a preparation method comprising the steps of: (1) treating anhydrosugar alcohol with acid component; (2) conducting addition reaction of the acid-treated anhydrosugar alcohol obtained in said step (1) and alkylene oxide; and (3) conducting addition reaction of the product obtained in said step (2) and alkylene oxide in the presence of base catalyst.

The acid component is not especially limited, and it may be selected from the group consisting of phosphoric acid, sulfuric acid, acetic acid, formic acid, heteropolyacid or a mixture thereof. In an embodiment, as the heteropolyacid, phosphotungstic acid, phosphomolybdic acid, silicotungstic acid or silicomolybdic acid, etc. may be used, and as other useful acid component, a commercially available acid component such as Amberlyst 15 (Dow Chemical), etc. can be used, too.

In an embodiment, the acid treatment can be conducted by using the acid component in an amount of 0.1 to 10 moles, preferably 0.1 to 8 moles, and more preferably 0.1 to 5 moles, based on 1 mole of anhydrosugar alcohol, under nitrogen atmosphere at an elevated temperature (for example, 80° C. to 200° C., or 90° C. to 180° C.), and then conducting pressure reduction under vacuum to remove moisture in the reactor, but it is not limited thereto.

The acid component is used in the above acid treatment to facilitate the ring opening of alkylene oxide in the addition reaction of alkylene oxide explained below.

In general, the reaction of adding alkylene oxide to alcohol proceeds under a base catalyst, but in case of anhydrosugar alcohol, due to structural characteristics, the rate of adding the alkylene oxide competes with the rate of opening and decomposition of the ring structure of anhydrosugar alcohol by the base catalyst. Accordingly, not only the anhydrosugar alcohol but also the decomposition product of the anhydrosugar alcohol reacts with the alkylene oxide, and the reaction product between the decomposition product of the anhydrosugar alcohol decomposed by the base catalyst and the alkylene oxide may act as a factor to lower product quality and storage stability. To the contrary, if anhydrosugar alcohol is first treated with an acid component and then subjected to addition reaction of alkylene oxide, the acid component facilitates the ring opening of the alkylene oxide without generating decomposition products of the anhydrosugar alcohol by the base catalyst, and thus anhydrosugar alcohol-alkylene oxide adduct can be easily produced by addition reaction of anhydrosugar alcohol and alkylene oxide. Therefore, when the acid-treated anhydrosugar alcohol and alkylene oxide are subjected to addition reaction, the conventional problems can be solved.

In an embodiment, the addition reaction of the acid-treated anhydrosugar alcohol and alkylene oxide can be conducted by slowly feeding alkylene oxide to the acid-treated anhydrosugar alcohol at an elevated temperature (for example, 100° C. to 180° C., or 120° C. to 160° C.) during a time of, for example, 1 hour to 8 hours, or 2 hours to 4 hours, but it is not limited thereto. The reaction molar ratio of alkylene oxide to 1 mole of anhydrosugar alcohol may be, for example, 1 mole or more, or 2 moles or more, and 30 moles or less, 20 moles or less, 15 moles or less, or 12 moles or less, and for example, it may be 1 mole to 30 moles, preferably 2 to 20 moles, but it is not limited thereto.

In an embodiment, the further addition reaction of the product obtained by addition reaction of the acid-treated anhydrosugar alcohol and alkylene oxide with additional alkylene oxide can be conducted, for example, in high pressure reactor capable of being pressurized (for example, pressurized to 3 MPa or higher) in the presence of base catalyst (for example, alkali metal hydroxide such as sodium hydroxide, potassium hydroxide, etc. or alkaline earth metal hydroxide such as calcium hydroxide, etc.) at an elevated temperature (for example, 100° C. to 180° C., or 120° C. to 160° C.) during a time of, for example, 1 hour to 8 hours, or 2 hours to 4 hours, but it is not limited thereto. The reaction molar ratio of the alkylene oxide to 1 mole of anhydrosugar alcohol may be, for example, 1 mole or more, 2 moles or more, or 3 moles or more, and 30 moles or less, 20 moles or less, 15 moles or less, or 12 moles or less, and for example, it may be 1 mole to 30 moles, preferably 2 to 20 moles, more preferably 3 to 15 moles, but it is not limited thereto. Prior to feeding of the base catalyst, the acid component used in the treatment can be filtered and removed.

The product obtained by the addition reaction of the acid-treated anhydrosugar alcohol and alkylene oxide (i.e., a compound in a form where alkylene oxide is added to anhydrosugar alcohol) has a very stable structure, and thus even in the presence of base catalyst, the ring structure of the anhydrosugar alcohol is neither easily opened nor decomposed at high temperature. Therefore, it is very advantageous for further addition reaction of alkylene oxide. If it is continued to use the acid catalyst even during the further additional reaction of alkylene oxide, the acid catalyst helps to promote ring opening of alkylene oxide, but the reaction rate decreases as the number of moles of added alkylene oxide increases. That is, the rate of adding alkylene oxide and the rate of ring opening of the alkylene oxide itself compete, and at this time, the rate of adding alkylene oxide becomes slow, and the self-condensation reaction between the ring-opened alkylene oxides and the generation of byproduct proceed, which may cause deterioration of quality. Therefore, the further addition reaction of alkylene oxide is conducted under base catalyst.

Thereafter, the step of removing metal ions released from the used base catalyst may be conducted additionally, and for this, a metal ion adsorbent such as, for example, Ambosol MP20 (magnesium silicate component) may be used.

In an embodiment, example of the polyisocyanate may be aromatic polyisocyanate such as methylenediphenyl diisocyanate (MDI) (for example, 2,4- or 4,4'-methylenediphenyl diisocyanate), xylylene diisocyanate (XDI), m- or p-tetramethylxylylene diisocyanate (TMXDI), toluene diisocyanate (TDI), di- or tetra-alkyldiphenylmethane diisocyanate, 3,3'-dimethyldiphenyl-4,4'-diisocyanate (TODI), phenylene diisocyanate (for example, 1,3-phenylene diisocyanate, 1,4-phenylene diisocyanate), naphthalene diisocyanate (NDI), or 4,4'-dibenzyl diisocyanate, etc.; aliphatic polyisocyanate such as hydrogenated MDI (H12MDI), 1-methyl-2,4-diisocyanatocyclohexane, 1,12-diisocyanatododecane, 1,6-diisocyanato-2,2,4-trimethylhexane, 1,6-diisocyanato-2,4,4-trimethylhexane, isophorone diisocyanate (IPDI), tetramethoxybutane-1,4-diisocyanate, butane-1,4-diisocyanate, hexamethylene diisocyanate (HDI) (for example, 1,6-hexamethylene diisocyanate), dimer fatty acid diisocyanate, dicyclohexylmethane diisocyanate, cyclohexane diisocyanate (for example, cyclohexane-1,4-diisocyanate) or ethylene diisocyanate, etc.; or a combination thereof, but it is not limited thereto.

In other embodiment, example of the polyisocyanate may be methylenediphenyl diisocyanate (MDI), ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3-diisocyanate, cyclohexane-1,4-diisocyanate, isophorone diisocyanate, 2,4-hexahydrotoluene diisocyanate, 2,6-hexahydrotoluene diisocyanate, dicyclohexylmethane-4,4'-diisocyanate (HMDI), 1,3-phenylene diisocyanate, 1,4-phenylene diisocyanate, 2,4-toluene diisocyanate, 2,6-toluene diisocyanate, mixed toluene diisocyanate of 2,4-toluene diisocyanate and 2,6-toluene diisocyanate (2,4-/2,6-isomer ratio=80/20), diphenylmethane-2,4'-diisocyanate, diphenylmethane-4,4'-diisocyanate, polydiphenylmethane diisocyanate (PMDI), naphthalene-1,5-diisocyanate, or a combination thereof, but it is not limited thereto.

More concretely, the polyisocyanate may be methylenediphenyl diisocyanate (MDI), toluene diisocyanate (TDI), hexamethylene diisocyanate (HDI), isophorone diisocyanate (IPDI), or a combination thereof.

In an embodiment, example of the hydroxyalkyl (meth) acrylate may be a linear or branched alkyl acrylate having hydroxyl group, a linear or branched alkyl methacrylate having hydroxyl group, or a combination thereof, and more concretely, it may be a linear or branched C1-C8 alkyl acrylate having hydroxyl group, a linear or branched C1-C8 alkyl methacrylate having hydroxyl group, or a combination thereof, and still more concretely, it may be hydroxymethyl acrylate, hydroxymethyl methacrylate, hydroxyethyl acrylate, hydroxyethyl methacrylate, hydroxypropyl acrylate, hydroxypropyl methacrylate, hydroxybutyl acrylate, hydroxybutyl methacrylate, hydroxypentyl acrylate, hydroxypentyl methacrylate, 2-hydroxyethylhexyl acrylate, 2-hydroxyethylhexyl methacrylate, 2-hydroxyethylbutyl acrylate, 2-hydroxyethylbutyl metacrylate, hydroxyoctyl acrylate, hydroxyoctyl methacrylate, or a combination thereof, and still more concretely, it may be 2-hydroxyethyl acrylate, 2-hydroxyethyl methacrylate, hydroxypropyl acrylate, hydroxypropyl methacrylate, hydroxybutyl acrylate, hydroxybutyl methacrylate, or a combination thereof, but it is not limited thereto.

In an embodiment, the hydrophilic acryl-modified polyurethane of the present invention may be represented by the following formula 2:

[Formula 2]

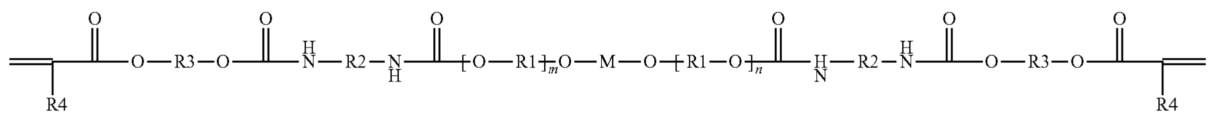

In the above formula 2, each of R1 is independently an alkylene group, concretely it is a C2-C8 linear or C3-C8 branched alkylene group, and more concretely it is a C2-C6 linear or C3-C6 branched alkylene group, each of R2 is independently an alkylene group, a cycloalkylene group, or an arylene group, and concretely it is a C2-C20 linear or C3-C20 branched alkylene group, a C3-C20 cycloalkylene group, or a C6-C20 arylene group, each of R3 is independently an alkylene group, concretely it is a C1-C8 linear or C3-C8 branched alkylene group, and more concretely it is a C2-C6 linear or C3-C6 branched alkylene group, each of R4 is independently a hydrogen atom or an alkyl group, and concretely it is a hydrogen atom or a C1-C4 linear or C3-C4 branched alkyl group, M is a divalent organic group derived from anhydrosugar alcohol, concretely it is a divalent organic group derived from isosorbide, isomannide or isoidide, and more concretely it is selected from the following formulas:

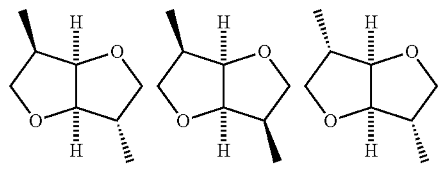

each of m and n independently represents an integer of 0 to 15, m+n represents an integer of 1 to 30, more concretely an integer of 1 to 25, still more concretely an integer of 1 to 20, still more concretely an integer of 3 to 15, and still more concretely an integer of 5 to 15.

More concretely, the hydrophilic acryl-modified polyurethane of the present invention may be represented by any one of the following formulas, but it is not limited thereto:

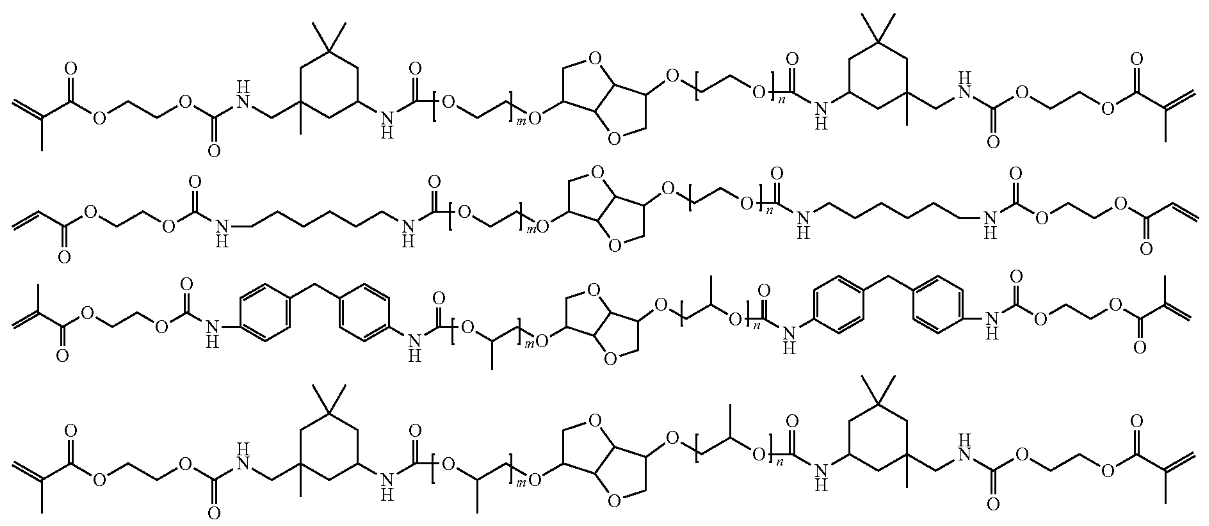

In the above formulas, each of m, n and m+n is independently the same as defined in the above formula 2.

The hydrophilic acryl-modified polyurethane of the present invention can be obtained by reacting polyisocyanate to the anhydrosugar alcohol-alkylene oxide adduct and then reacting hydroxyalkyl (meth)acrylate thereto.

Therefore, according to the other aspect of the present invention, provided is a method for preparing a hydrophilic acryl-modified polyurethane, comprising the steps of: (1) reacting anhydrosugar alcohol-alkylene oxide adduct and polyisocyanate to prepare intermediate having terminal isocyanate group; and (2) reacting the intermediate obtained in said step (1) and hydroxyalkyl (meth)acrylate.

According to an embodiment, the hydrophilic acryl-modified polyurethane of the present invention can be prepared by reacting 2 equivalents of polyisocyanate to 1 equivalent of anhydrosugar alcohol (e.g., isosorbide (ISB))-alkylene oxide adduct to prepare intermediate having terminal isocyanate group, and then reacting the terminal isocyanate group of the intermediate with 2 equivalents of hydroxyalkyl (meth)acrylate (e.g., 2-hydroxyethyl methacrylate).

In case of acryl-modified polyurethane prepared using a general alkylene oxide (for example, ethylene oxide or polypropylene oxide, etc.) rather than the anhydrosugar alcohol-alkylene oxide adduct, the hydrophilicity is lowered so that it does not dissolve in water (when polypropylene oxide is applied), or if a waterborne paint is prepared using it, the crack resistance and water resistance are lowered (when ethylene oxide is applied).

According to an embodiment, the reaction of the anhydrosugar alcohol-alkylene oxide adduct and polyisocyanate may be conducted optionally in the presence of catalyst (for example, tin-based catalyst such as dibutyltin dilaurate (DBTDL)) at room temperature or an elevated temperature (for example, at 50 to 100° C., preferably at 50 to 70° C.) during a proper time (for example, 0.1 to 5 hours, preferably 0.5 to 2 hours).

According to an embodiment, the reaction of the product of reacting anhydrosugar alcohol-alkylene oxide adduct and polyisocyanate (i.e., the intermediate obtained in the above step (1)) and hydroxyalkyl (meth)acrylate may be conducted optionally in the presence of catalyst (for example, tin-based catalyst such as dibutyltin dilaurate (DBTDL)) at an elevated temperature (for example, at 50 to 100° C., preferably at 50 to 70° C.) during a proper time (for example, 0.1 to 5 hours, preferably 0.5 to 2 hours).

[Waterborne Coating Composition]

The waterborne coating composition according to the present invention comprises a polymer prepared by polymerization reaction of the above hydrophilic acryl-modified polyurethane and hydrophilic acryl monomer; and water.

In an embodiment, the amount of the hydrophilic acryl-modified polyurethane contained in the waterborne coating composition, based on 100 parts by weight of the sum of the hydrophilic acryl-modified polyurethane, hydrophilic acryl monomer and water, may be greater than 30 parts by weight to less than 85 parts by weight, more concretely it may be 31 to 84 parts by weight, still more concretely it may be 32 to 84 parts by weight, still more concretely it may be 35 to 80 parts by weight, and still more concretely it may be 40 to 80 parts by weight. If the amount of the hydrophilic acryl-modified polyurethane contained in the waterborne coating composition is too less than the above level, the adhesion may be insufficient and the coating layer formed from the composition may have crack and poor water resistance. To the contrary, if the amount of the hydrophilic acryl-modified polyurethane contained in the waterborne coating composition is too greater than the above level, the adhesion may become very poor.

In an embodiment, as the hydrophilic acryl monomer, one or more selected from the group consisting of an acryl monomer having carboxyl group, an amide-based acryl monomer and an acryl monomer having hydroxyl group may be used.

More concretely, the acryl monomer having carboxyl group may be one or more selected from the group consisting of acrylic acid, methacrylic acid, itaconic acid and maleic acid, but it is not limited thereto, and the amide-based acryl monomer may be one or more selected from the group consisting of acrylamide, N-methylolamide, diacetone acrylamide and glycidyl methacrylate, but it is not limited thereto, and the acryl monomer having hydroxyl group may be one or more selected from the group consisting of 2-hydroxyethyl acrylate, 2-hydroxyethyl methacrylate, hydroxypropyl acrylate and hydroxypropyl methacrylate, but it is not limited thereto.

In an embodiment, the amount of the hydrophilic acryl monomer contained in the waterborne coating composition, based on 100 parts by weight of the sum of the hydrophilic acryl-modified polyurethane, hydrophilic acryl monomer and water, may be 10 to 55 parts by weight, more concretely it may be 10 to 50 parts by weight, and still more concretely it may be 15 to 50 parts by weight. If the amount of the hydrophilic acryl monomer contained in the waterborne coating composition is too less than the above level, the adhesion may become poor. To the contrary, if the amount of the hydrophilic acryl monomer contained in the waterborne coating composition is too greater than the above level, the adhesion may be insufficient and and the coating layer formed from the composition may have crack and poor water resistance.

In an embodiment, the amount of water contained in 100 parts by weight of the waterborne coating composition, based on 100 parts by weight of the sum of the hydrophilic acryl-modified polyurethane, hydrophilic acryl monomer and water, may be 5 to 40 parts by weight, more concretely it may be 5 to 35 parts by weight, and still more concretely it may be 5 to 30 parts by weight.

The waterborne coating composition of the present invention can be obtained by conducting polymerization reaction of the hydrophilic acryl-modified polyurethane and hydrophilic acryl monomer in water solvent.

Therefore, according to another aspect of the present invention, provided is a method for preparing a waterborne coating composition, comprising a step of conducting polymerization reaction of the hydrophilic acryl-modified polyurethane and hydrophilic acryl monomer, in the presence of water as solvent and polymerization initiator.

According to an embodiment, in the polymerization reaction step, the use amount of the hydrophilic acryl-modified polyurethane, based on 100 parts by weight of the sum of the used hydrophilic acryl-modified polyurethane, hydrophilic acryl monomer and water, may be greater than 30 parts by weight to less than 85 parts by weight, more concretely it may be 31 to 84 parts by weight, still more concretely it may be 32 to 84 parts by weight, still more concretely it may be 35 to 80 parts by weight, and still more concretely it may be 40 to 80 parts by weight. If the amount of the hydrophilic acryl-modified polyurethane used in the polymerization reaction step is too less than the above level, the adhesion may be insufficient and the coating layer formed from the composition may have crack and poor water resistance. To the contrary, if the amount of the hydrophilic acryl-modified polyurethane used in the polymerization reaction step is too greater than the above level, the adhesion may become very poor.

According to an embodiment, in the polymerization reaction step, the use amount of the hydrophilic acryl monomer, based on 100 parts by weight of the sum of the used hydrophilic acryl-modified polyurethane, hydrophilic acryl monomer and water, may be 10 to 55 parts by weight, more concretely it may be 10 to 50 parts by weight, and still more concretely it may be 15 to 50 parts by weight. If the amount of the hydrophilic acryl monomer used in the polymerization reaction step is too less than the above level, the adhesion may become poor. To the contrary, if the amount of the hydrophilic acryl monomer used in the polymerization reaction step is too greater than the above level, the adhesion may be insufficient and the coating layer formed from the composition may have crack and poor water resistance.

According to an embodiment, in the polymerization reaction step, the use amount of water as solvent, based on 100 parts by weight of the sum of the used hydrophilic acryl-modified polyurethane, hydrophilic acryl monomer and water, may be 5 to 40 parts by weight, more concretely it may be 5 to 35 parts by weight, and still more concretely it may be 5 to 30 parts by weight.

According to an embodiment, in the polymerization reaction step, the use amount of the polymerization initiator, based on 100 parts by weight of the sum of the used hydrophilic acryl-modified polyurethane, hydrophilic acryl monomer and water, may be 0.01 to 5 parts by weight, and more concretely it may be 0.1 to 1 part by weight.

According to an embodiment, the reaction of the hydrophilic acryl-modified polyurethane and hydrophilic acryl monomer can be conducted in water solvent in the presence of a polymerization initiator (for example, a persulfate-based catalyst such as potassium persulfate (KPS)) at an elevated temperature (for example, at 50 to 100° C., preferably at 60 to 90° C.) during a proper time (for example, 0.5 to 5 hours, preferably 1 to 3 hours).

The waterborne coating composition of the present invention can further comprise additive(s) that can be used conventionally in waterborne paint.

The present invention is explained in more detail through the following Examples and Comparative Examples. However, the scope of the present invention is not limited thereby in any manner.

EXAMPLES

<Preparation of Anhydrosugar Alcohol-Alkylene Oxide Adduct>

Preparation Example A1: Preparation of Isosorbide-Ethylene Oxide 5 Mole Adduct 146 g of isosorbide and 0.15 g of phosphoric acid (85%) as an acid component were put into a reactor that could be pressurized, and the inside of the reactor was substituted with nitrogen and heated up to 100° C. and the moisture in the reactor was removed by pressure reduction under vacuum. Then, while firstly adding 88 g of ethylene oxide slowly thereto, the reaction was conducted at 100 to 140° C. for 2 to 3 hours. At that time, the reaction temperature was controlled so as not to exceed 140° C. Thereafter, the inside of the reactor was cooled to 50° C., and then 0.3 g of potassium hydroxide was added to the reactor, the inside of the reactor was substituted with nitrogen and heated up to 100° C. and the moisture in the reactor was removed by pressure reduction under vacuum. Then, while secondly adding 132 g of ethylene oxide slowly thereto, the reaction was conducted at 100 to 140° C. for 2 to 3 hours. After completing the reaction, the inside of the reactor was cooled to 50° C., 4 g of Ambosol MP20 was added thereto, and the inside of the reactor was reheated and agitated at 100° C. to 120° C. for 1 to 5 hours to remove residual metal ions (at that time, the inside of the reactor was substituted with nitrogen and/or pressure reduction under vacuum was carried out). After confirming that no metal ions were detected, the inside of the reactor was cooled to 60° C. to 90° C. and the remaining byproduct was removed to obtain 362 g of isosorbide-ethylene oxide 5 mole adduct in transparent liquid form.

Preparation Example A2: Preparation of Isosorbide-Ethylene Oxide 10 Mole Adduct Excepting that the secondly added amount of ethylene oxide was changed from 132 g to 352 g, the same method as Preparation Example A1 was conducted to obtain 551 g of isosorbide-ethylene oxide 10 mole adduct in transparent liquid form.

Preparation Example A3: Preparation of Isosorbide-Propylene Oxide 5 Mole Adduct

As the raw material for the addition reaction, propylene oxide was used instead of ethylene oxide. Concretely, excepting that 116 g of propylene oxide was firstly added instead of 88 g of ethylene oxide and 174 g of propylene oxide was secondly added instead of 132 g of ethylene oxide, the same method as Preparation Example A1 was conducted to obtain 423 g of isosorbide-propylene oxide 5 mole adduct in transparent liquid form.

Preparation Example A4: Preparation of Isosorbide-Propylene Oxide 10 Mole Adduct As the raw material for the addition reaction, propylene oxide was used instead of ethylene oxide. Concretely, excepting that 116 g of propylene oxide was firstly added instead of 88 g of ethylene oxide and 465 g of propylene oxide was secondly added instead of 132 g of ethylene oxide, the same method as Preparation Example A1 was conducted to obtain 698 g of isosorbide-propylene oxide 10 mole adduct in transparent liquid form.

Preparation of Hydrophilic Acryl-Modified Polyurethane

Example A1: Preparation of Hydrophilic Acryl-Modified Polyurethane by Using Isosorbide-Ethylene Oxide 5 Mole Adduct as Polyol, Isophorone Diisocyanate (IPDI) as Polyisocyanate and 2-Hydroxyethyl Methacrylate as Hydroxyalkyl (Meth)Acrylate Into a 3-necked equipped an agitator, 222 g of isophorone diisocyanate (IPDI) and 0.1 g of dibutyltin dilaurate (DBTDL) as reaction catalyst were fed. While agitating the mixture at room temperature, 183 g of the isosorbide-ethylene oxide 5 mole adduct prepared in Preparation Example A1 was added slowly thereto and the crosslinking reaction was conducted. After completing addition of the isosorbide-ethylene oxide 5 mole adduct, the mixture was agitated at 50° C. for 1 hour for aging, and 65 g of 2-hydroxyethyl methacrylate was added slowly thereto and the acryl modification reaction was conducted. After completing addition of 2-hydroxyethyl methacrylate, the mixture was agitated at 50° C. for 1 hour for aging, and the reaction product was cooled to room temperature to obtain 467 g of hydrophilic acryl-modified polyurethane of the following formula 3.

[Formula 3]

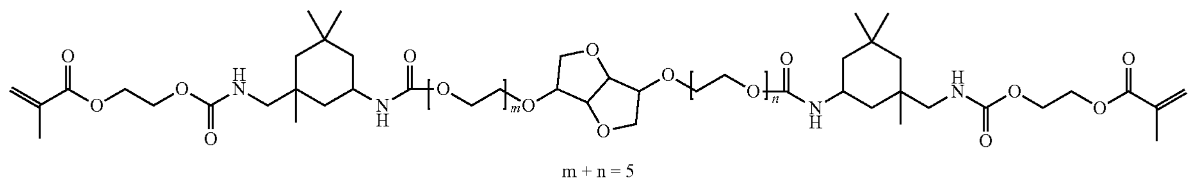

m + n = 5

Example A2: Preparation of Hydrophilic Acryl-Modified Polyurethane by Using Isosorbide-Ethylene Oxide 10 Mole Adduct as Polyol, Hexamethylene Diisocyanate (HDI) as Polyisocyanate and 2-Hydroxyethyl Acrylate as Hydroxyalkyl (Meth)Acrylate Excepting that 168 g of hexamethylene diisocyanate (HDI) was used instead of isophorone diisocyanate (IPDI) as polyisocyanate, 293 g of the isosorbide-ethylene oxide 10 mole adduct prepared in Preparation Example A2 was used instead of the isosorbide-ethylene oxide 5 mole adduct prepared in Preparation Example A1 as polyol and 58 g of 2-hydroxyethyl acrylate was used instead of 2-hydroxyethyl methacrylate as hydroxyalkyl (meth)acrylate, the same method as Example A1 was conducted to obtain 515 g of hydrophilic acryl-modified polyurethane of the following formula 4.

[Formula 4]

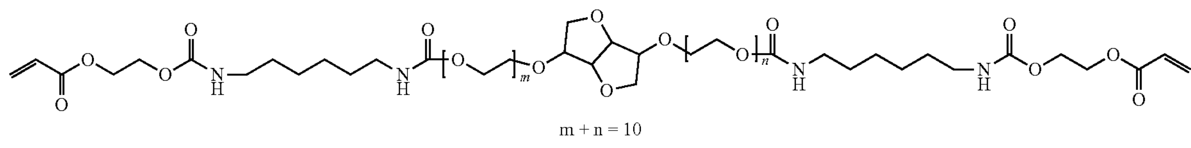

m + n = 10

Example A3: Preparation of Hydrophilic Acryl-Modified Polyurethane by Using Isosorbide-Propylene Oxide 5 Mole Adduct as Polyol, Methylenediphenyl Diisocyanate (MDI) as Polyisocyanate and 2-Hydroxyethyl Methacrylate as Hydroxyalkyl (Meth)Acrylate Excepting that 250 g of methylenediphenyl diisocyanate (MDI) was used instead of isophorone diisocyanate (IPDI) as polyisocyanate and 218 g of the isosorbide-propylene oxide 5 mole adduct prepared in Preparation Example A3 was used instead of the isosorbide-ethylene oxide 5 mole adduct prepared in Preparation Example A1 as polyol, the same method as Example A1 was conducted to obtain 529 g of hydrophilic acryl-modified polyurethane of the following formula 5.

[Formula 5]

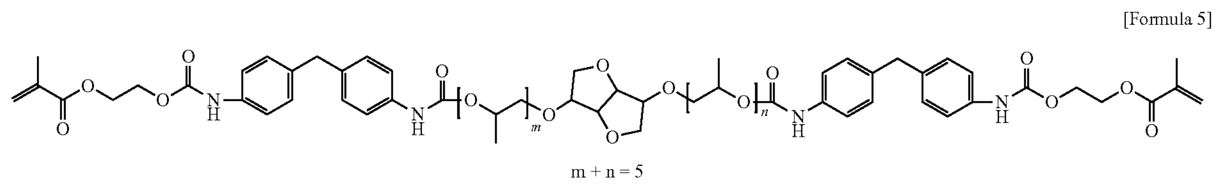

m + n = 5

Example A4: Preparation of Hydrophilic Acryl-Modified Polyurethane by Using Isosorbide-Propylene Oxide 10 Mole Adduct as Polyol, Isophorone Diisocyanate (IPDI) as Polyisocyanate and 2-Hydroxyethyl Methacrylate as Hydroxyalkyl (Meth)Acrylate Excepting that 363 g of the isosorbide-propylene oxide 10 mole adduct prepared in Preparation Example A4 was used instead of the isosorbide-ethylene oxide 5 mole adduct prepared in Preparation Example A1 as polyol, the same method as Example A1 was conducted to obtain 643 g of hydrophilic acryl-modified polyurethane of the following formula 6.

[Formula 6]

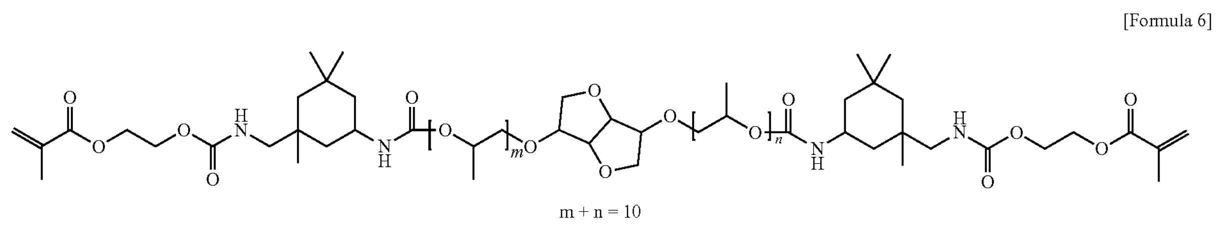

m + n = 10

Comparative Example A1: Preparation of Hydrophilic Acryl-Modified Polyurethane by Using Isosorbide as Polyol, Isophorone Diisocyanate (IPDI) as Polyisocyanate and 2-Hydroxyethyl Methacrylate as Hydroxyalkyl (Meth)Acrylate Excepting that 146 g of isosorbide was used instead of the isosorbide-ethylene oxide 5 mole adduct prepared in Preparation Example A1 as polyol, the same method as Example A1 was conducted to obtain 431 g of hydrophilic acryl-modified polyurethane of the following formula 7.

[Formula 7]

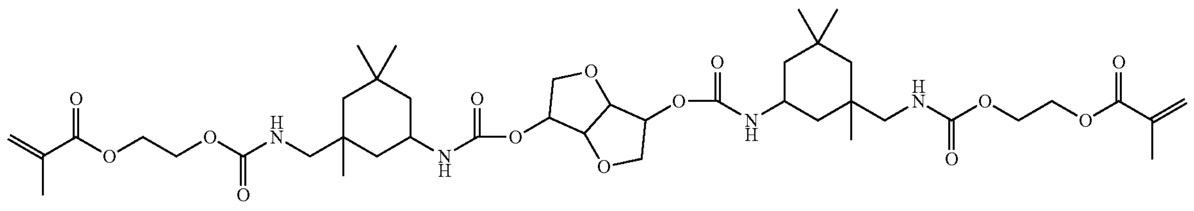

Comparative Example A2: Preparation of Hydrophilic Acryl-Modified Polyurethane by Using Polyethylene Glycol (Number Average Molecular Weight: 500) as Polyol, Isophorone Diisocyanate (IPDI) as Polyisocyanate and 2-Hydroxyethyl Methacrylate as Hydroxyalkyl (Meth)Acrylate Excepting that 500 g of polyethylene glycol (number average molecular weight: 500) was used instead of the isosorbide-ethylene oxide 5 mole adduct prepared in Preparation Example A1 as polyol, the same method as Example A1 was conducted to obtain 782 g of hydrophilic acryl-modified polyurethane of the following formula 8.

[Formula 8]

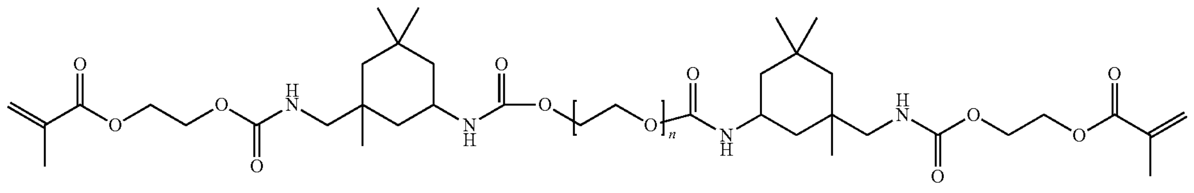

Comparative Example A3: Preparation of Hydrophilic Acryl-Modified Polyurethane by Using Polypropylene Glycol (Number Average Molecular Weight: 500) as Polyol, Hexamethylene Diisocyanate (HDI) as Polyisocyanate and 2-Hydroxyethyl Acrylate as Hydroxyalkyl (Meth)Acrylate Excepting that 168 g of hexamethylene diisocyanate (HDI) was used instead of isophorone diisocyanate (IPDI) as polyisocyanate, 500 g of polypropylene glycol (number average molecular weight: 500, Kumho Petrochemical) was used instead of the isosorbide-ethylene oxide 5 mole adduct prepared in Preparation Example A1 as polyol and 58 g of 2-hydroxyethyl acrylate was used instead of 2-hydroxyethyl methacrylate as hydroxyalkyl (meth)acrylate, the same method as Example A1 was conducted to obtain 720 g of hydrophilic acryl-modified polyurethane of the following formula 9.

[Formula 9]

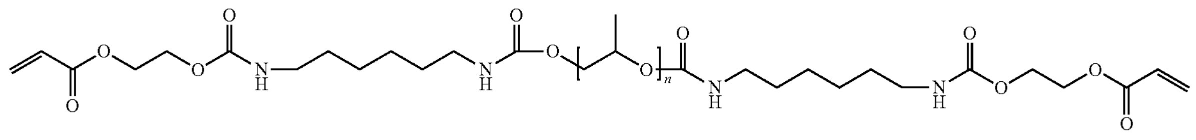

Comparative Example A4: Preparation of Hydrophilic Acryl-Modified Polyurethane by Using Polytetramethylene Glycol (Number Average Molecular Weight: 1,000) as Polyol, Methylenediphenyl Diisocyanate (MDI) as Polyisocyanate and 2-Hydroxyethyl Methacrylate as Hydroxyalkyl (Meth)Acrylate Excepting that 250 g of methylenediphenyl diisocyanate (MDI) was used instead of isophorone diisocyanate (IPDI) as polyisocyanate and 1,000 g of polytetramethylene glycol (number average molecular weight: 1,000, Aldrich) was used instead of the isosorbide-ethylene oxide 5 mole adduct prepared in Preparation Example A1 as polyol, the same method as Example A1 was conducted to obtain 1,308 g of hydrophilic acryl-modified polyurethane of the following formula 10.

[Formula 10]

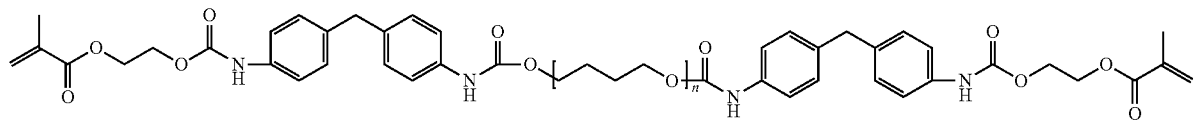

<Preparation of Waterborne Coating Composition>

Examples B1 to B4 and Comparative Examples B1 to B5: Standard Preparation Method Water, potassium persulfate (KPS) as polymerization initiator, hydrophilic acryl-modified polyurethane and acryl monomer were mixed with the weight ratio shown in the following Table 1 and sufficiently agitated by using a high-speed dissolver, and the mixture was heated to 85° C. and agitated, and then the polymerization reaction was conducted sufficiently for 3 hours to prepare the waterborne coating composition of each of Examples B1 to B4 and Comparative Examples B1 to B5.

TABLE 1

| | Example | | | | Comparative Example | | | | |
|---|---|---|---|---|---|---|---|---|---|
| Material | B1 | B2 | B3 | B4 | B1 | B2 | B3 | B4 | B5 |
| Hydrophilic acryl-modified polyurethane (parts by weight) | Ex. A1 (60) | Ex. A2 (40) | Ex. A3 (80) | Ex. A4 (50) | Comp. Ex. A1 (60) | Comp. Ex. A2 (60) | Comp. Ex. A3 (60) | Comp. Ex. A4 (60) | — |
| Acryl monomer (parts by weight) | AA (5) HEMA (15) AAM (10) | AA (10) HEMA (20) AAM (10) | AA (5) HEMA (5) AAM (5) | AA (5) HEMA (20) AAM (15) | AA (5) HEMA (15) AAM (10) | AA (5) HEMA (15) AAM (10) | AA (5) HEMA (15) AAM (10) | AA (5) HEMA (15) AAM (10) | AA (25) HEMA (30) AAM (25) |
| Water (parts by weight) | 10 | 20 | 5 | 10 | 10 | 10 | 10 | 10 | 20 |
| KPS (parts by weight) | | | | | 0.5 | | | | |

AA: Acrylic acid

HEMA: 2-hydroxyethyl methacrylate

AAM: Acrylamide

KPS: potassium persulfate

AA, HEMA, AAM and KPS are those manufactured by Samchun Chemicals.

<Evaluation of Properties of the Waterborne Coating Composition>

The waterborne coating composition prepared in each of Examples B1 to B4 and Comparative Examples B1 to B5 was coated on polyvinyl chloride (PVC) film two times and then dried to prepare a test sample comprising polyvinyl chloride film and a coating layer formed on the film. The test sample was evaluated for adhesion, crack resistance and water resistance according to the following methods, and the results are shown in the following Table 2.

<Method of Evaluating the Properties>

(1) Adhesion

According to ASTM D 3359 which is the adhesion test standard for coatings, the coating layer of the test sample was scratched with a cross hatch cutter by crossing lines thereon to make 100 grid pieces with a size of 10 mm×10 mm, and a tape was attached on the grid pieces and rubbed with uniform force, and then the tape was taken off. The number of grid pieces detached from the coating layer of the test sample and adhered to the removed tape was counted. According to the number of grid pieces detached from the coating layer of the test sample, the degree of adhesion was expressed as a grade of from 0B to 5B below. Smaller number of grid pieces detached from the coating layer of the test sample means better adhesion of the coating layer (grade 4B or higher is required).

[Criteria for Classification of Cross Cut (ASTM D 3359)]

| Grade | Criteria |
|---|---|
| 5B | No grid piece was detached from the coating layer. |
| 4B | 1 to 5 grid pieces were detached from the coating layer. |
| 3B | 6 to 15 grid pieces were detached from the coating layer. |
| 2B | 16 to 35 grid pieces were detached from the coating layer. |
| 1B | 36 to 65 grid pieces were detached from the coating layer. |
| 0B | 66 or more grid pieces were detached from the coating layer. |

(2) Crack Resistance

After repeating 5 times of storage of the test sample in a freezer at −20° C. for 1 hour and then in a hot air dryer at 80° C. for 1 hour, observation was made with the naked eye to confirm whether or not cracks such as breaking, peeling, or splitting of the coating layer of the test sample were generated.

(3) Water Resistance

After soaking the test sample in water at room temperature for 72 hours, observation was made with the naked eye to confirm whether or not swelling, cracking, peeling, discoloration, etc. of the coating layer occurred.

TABLE 2

| | Example | | | | Comparative Example | | | | |
|---|---|---|---|---|---|---|---|---|---|
| Property | B1 | B2 | B3 | B4 | B1 | B2 | B3 | B4 | B5 |
| Adhesion | 5B | 4B | 4B | 5B | 4B | 4B | Phase separation | | 3B |
| Crack resistance | No problem | No problem | No problem | No problem | No problem | Crack generation | (Not applicable) | | Crack generation |
| Water resistance | No problem | No problem | No problem | No problem | | Peeling | | | Peeling |

As shown in Table 2 above, in case of the waterborne coating compositions of Examples B1 to B4 prepared by using the hydrophilic acryl-modified polyurethane according to the present invention, all of the standard requirements for adhesion, crack resistance and water resistance were achieved. That is, the waterborne coating composition according to the present invention is an eco-friendly paint free of organic solvent and/or surfactant, and has excellent adhesion, crack resistance and water resistance.

However, in case of Comparative Example B1 using an acryl-modified polyurethane prepared by using anhydrosugar alcohol (ISB), not anhydrosugar alcohol-alkylene oxide adduct, peeling occurred in water at room temperature, resulting in poor water resistance. In addition, in case of the waterborne coating composition of Comparative Example B2 using an acryl-modified polyurethane prepared by using polyethylene glycol (a hydrophilic polyol for general purpose), cracks were generated in the coating layer, and peeling occurred in water at room temperature, resulting in poor water resistance. Furthermore, in case of the waterborne coating compositions of Comparative Examples B3 and B4 using an acryl-modified polyurethane prepared by using polypropylene glycol or polytetramethylene glycol (hydrophilic polyols for general purpose), phase separation occurred within the coating composition, so that the evaluation of properties as waterborne paint was impossible.

Also, in case of the waterborne coating composition of Comparative Example B5 not using acryl-modified polyurethane itself, the adhesion was insufficient, cracks were generated in the coating layer, and peeling occurred in water at room temperature, resulting in poor water resistance.

The invention claimed is:

1. A waterborne coating composition comprising: a polymer prepared by polymerization reaction of hydrophilic acryl-modified polyurethane and hydrophilic acryl monomer; and water, wherein the hydrophilic acryl-modified polyurethane comprises: polymerized units derived from anhydrosugar alcohol-alkylene oxide adduct; polymerized units derived from polyisocyanate; and polymerized units derived from hydroxyalkyl (meth)acrylate.

2. The waterborne coating composition of claim 1, wherein the hydrophilic acryl monomer is one or more selected from the group consisting of an acryl monomer having carboxyl group, an amide-based acryl monomer and an acryl monomer having hydroxyl group.

3. The waterborne coating composition of claim 1, wherein the amount of the hydrophilic acryl-modified polyurethane is greater than 30 parts by weight to less than 85 parts by weight, based on 100 parts by weight of the sum of the hydrophilic acryl-modified polyurethane, hydrophilic acryl monomer and water.

4. The waterborne coating composition of claim 1, wherein the anhydrosugar alcohol-alkylene oxide adduct is an adduct obtained by reacting hydroxyl group(s) at both ends or one end of anhydrosugar alcohol with alkylene oxide, and wherein the alkylene oxide is a linear alkylene oxide having 2 to 8 carbons or a branched alkylene oxide having 3 to 8 carbons.

5. The waterborne coating composition of claim 4, wherein the anhydrosugar alcohol is isosorbide, isomannide, isoidide or a mixture thereof.

6. The waterborne coating composition of claim 1, wherein the anhydrosugar alcohol-alkylene oxide adduct is that prepared by a preparation method comprising the steps of: (1) treating anhydrosugar alcohol with acid component; and (2) conducting addition reaction of the acid-treated anhydrosugar alcohol obtained in said step (1) and alkylene oxide.

7. The waterborne coating composition of claim 1, wherein the polyisocyanate is methylenediphenyl diisocyanate (MDI), toluene diisocyanate (TDI), hexamethylene diisocyanate (HDI), isophorone diisocyanate (IPDI), or a combination thereof.

8. The waterborne coating composition of claim 1, wherein the hydroxyalkyl (meth)acrylate is 2-hydroxyethyl acrylate, 2-hydroxyethyl methacrylate, hydroxypropyl acrylate, hydroxypropyl methacrylate, hydroxybutyl acrylate, hydroxybutyl methacrylate, or a combination thereof.

9. The waterborne coating composition of claim 1, wherein the hydrophilic acryl-modified polyurethane is represented by the following formula 2:

[Formula 2]

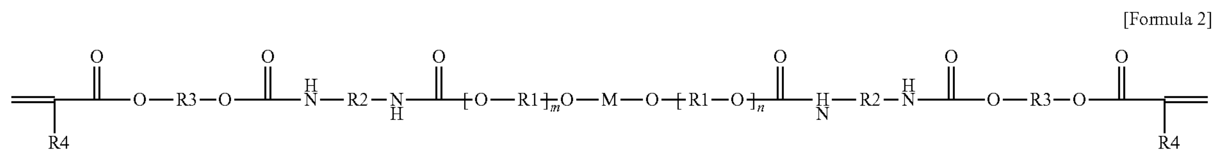

in the above formula 2, each of R1 is independently an alkylene group, each of R2 is independently an alkylene group, a cycloalkylene group, or an arylene group, each of R3 is independently an alkylene group, each of R4 is independently a hydrogen atom or an alkyl group, M is a divalent organic group derived from anhydrosugar alcohol, each of m and n independently represents an integer of 0 to 15, and m+n represents an integer of 1 to 30.

10. The waterborne coating composition of claim 9, wherein in the formula 2, each of R1 is independently a C2-C8 linear or C3-C8 branched alkylene group, each of R2 is independently a C2-C20 linear or C3-C20 branched alkylene group, a C3-C20 cycloalkylene group, or a C6-C20 arylene group, each of R3 is independently a C1-C8 linear or C3-C8 branched alkylene group, each of R4 is independently a hydrogen atom or a C1-C4 linear or C3-C4 branched alkyl group, M is a divalent organic group derived from isosorbide, isomannide or isoidide, each of m and n independently represents an integer of 0 to 15, and m+n represents an integer of 1 to 25.

11. A method for preparing a waterborne coating composition, comprising a step of conducting polymerization reaction of hydrophilic acryl-modified polyurethane and hydrophilic acryl monomer, in the presence of water as solvent and polymerization initiator, wherein the hydrophilic acryl-modified polyurethane comprises: polymerized units derived from anhydrosugar alcohol-alkylene oxide adduct; polymerized units derived from polyisocyanate; and polymerized units derived from hydroxyalkyl (meth)acrylate.

* * * * *